United States Patent [19]

Kimura

[11] Patent Number: 5,282,378
[45] Date of Patent: Feb. 1, 1994

[54] FLUID ACTUATED, DOUBLE ACTING MACHINE FOR PUNCHING, CUTTING, BENDING OR THE LIKE

[75] Inventor: Kiyoshi Kimura, Fujisawa, Japan

[73] Assignee: Kabushiki Kaisha Ogura, Tokyo, Japan

[21] Appl. No.: 939,332

[22] Filed: Sep. 2, 1992

[30] Foreign Application Priority Data

Jan. 10, 1991 [JP] Japan .................. 4-003222

[51] Int. Cl.⁵ .............................................. B26B 17/00
[52] U.S. Cl. .............................. 72/453.15; 72/453.16; 30/180; 29/751
[58] Field of Search .............. 30/180, 182; 72/453.16, 72/453.15; 29/750, 751

[56] References Cited

U.S. PATENT DOCUMENTS

| | | | |
|---|---|---|---|
| 3,165,140 | 1/1965 | Hazelton | 72/26 |
| 3,733,699 | 5/1973 | Bock | 30/180 |
| 4,382,331 | 5/1983 | Kimura | 30/180 |
| 4,936,126 | 6/1990 | Sato | 72/21 |
| 5,111,681 | 5/1992 | Yasui et al. | 72/453.13 |
| 5,152,162 | 10/1992 | Ferraro et al. | 72/453.16 |
| 5,195,354 | 3/1993 | Yasui et al. | 72/453.16 |

FOREIGN PATENT DOCUMENTS

| | | | |
|---|---|---|---|
| 0007440 | 1/1984 | Japan | 72/21 |
| 01-48424 | 6/1989 | Japan | 72/453.16 |
| 0456333 | 2/1975 | U.S.S.R. | 29/751 |

*Primary Examiner*—David Jones
*Attorney, Agent, or Firm*—Dickstein, Shapiro & Morin

[57] ABSTRACT

A hydraulic punching machine is disclosed which has a casing having formed therein a piston chamber in which a piston is reciprocably mounted to define a pair of opposed fluid chambers, and a fluid reservoir for containing a hydraulic fluid. The piston has a piston rod carrying a punch for movement into and out of engagement with a die on the casing. Also mounted to the casing is a motor driven pump for pressurizing the fluid. A solenoid actuated spool valve alternately places the fluid chambers in communication with the pump and with a fluid drain. The solenoid is connected to an electric control circuit capable of sensing the extension and contraction of the piston rod. Therefore, upon extension of the piston rod, with the consequent creation of a punch in the work such as sheet steel, the control circuit cases the spool valve to automatically contract the piston rod under fluid pressure.

4 Claims, 6 Drawing Sheets

FLUID ACTUATED, DOUBLE ACTING MACHINE FOR PUNCHING, CUTTING, BENDING OR THE LIKE

BACKGROUND OF THE INVENTION

The present invention relates to a fluid actuated, double acting, linear actuating machine suitable for use in the punching of sheet metal, the cutting or bending of reinforcing steel rods or tubes, clinching and stamping, among other applications. More specifically, the invention pertains to such a machine of the .portable class integrally comprising a fluid pressure circuit with provisions for automatic retraction of the piston rod under fluid pressure.

The hydraulic linear actuating machine of the type under consideration comprises a piston slidably housed in a cylinder to define a pair of opposed fluid chambers therein, a piston rod coupled to the piston and slidably extending through one end of the cylinder, and a hydraulic circuit for the delivery and discharge of a hydraulic fluid under pressure into and out of the fluid chambers. The machine lends itself to use for punching, cutting and other applications by having an appropriate tool such as a punch or cutter replaceably mounted to the end of the piston rod. It is used in factories where steel sheets and steel rods are worked upon, as well as at sites of construction.

Conventionally, the linear actuating machine has been usually divided into two parts, one being the machine part comprising the cylinder, piston and so forth, and the other being a hydraulic unit comprising a hydraulic fluid reservoir and a pump. The machine part and the hydraulic unit have been intercommunicated via flexible conduits. For use at construction sites, the hydraulic unit has been placed in a convenient position, and the machine part has been carried about for working on desired parts.

The machine of such conventional make is not totally devoid of advantages. Being of relatively compact, lightweight construction, the machine part is convenient for use at factories or under other tidy circumstances. At construction sites, however, where many unexpected obstacles are to be encountered, much care has been needed in moving the machine part so that the flexible conduits may not be caught by such obstacles. Further the machine part has been movable only within the range permitted by the lengths of the flexible conduits, and the hydraulic unit itself has had to be replaced for moving the machine part beyond that range. An additional inconvenience is that the flexible conduits have had to be freed from their air contents at the cost of considerable time and labor preparatory to the commencement of actual operation.

The applicant is aware of a known portable hydraulic actuating machine in which the machine part and the hydraulic unit are integrally combined, as disclosed in U.S. Pat. No. 3,733,699. This known machine incorporates all of the cylinder, piston and pump into a single housing and relies on fluid pressure for the power stroke of the piston and on spring means for its return stroke.

Being free from elongate flexible conduits, the integrated actuating machine is highly portable and easy of use. Moreover, because of the shorter distance between pump and cylinder, the machine is good in piston response to pressurized fluid pressure. The portability and operability of the integrated actuating machine has earned it an increasing acceptance at construction sites in recent years.

The integrated actuating machine has one drawback, however. Relying on the force of a spring for its return stroke, the machine has had difficulties in retracting the piston rod in applications where much force is required for the return stroke. Take, for example, the use of the prior art machine as a punch. The machine will encounter great frictional resistance when the work being punched is very thick or when holes are created in the work with very small clearances for dimensional accuracy. The frictional resistance can be such that the piston rod has become unretractable solely by the force of the spring.

A conventional solution to this problem has been to mount a sleeve or sheathe of resilient material such as polyurethane rubber around the piston rod to which a punching tool is also attached. As the resilient sleeve becomes compressed upon punching, the energy thus stored in the sleeve is utilized for withdrawing the tool from within the hole.

This solution is unsatisfactory because of the relatively small force offered by the resilient sleeve. Additionally, the resilient sleeve itself represents an impediment to punching operation.

The applicant is not to claim that double acting machines have not so far existed in the art under consideration. Such a machine, complete with a manual directional control valve, has been used for the reshaping of reinforcing steel rods or the like that have been subjected to compressive or tensile bending. This double acting reshaping machine presupposes such use that the extension or retraction of the piston rod is manually controlled while visually observing the bend of a reinforcing steel rod or the like.

The above known double acting machine is not applicable to punching or like operations. When used as a punch, for example, the machine requires manual actuation of the direction control valve each time a hole is created. Further the electric motor driving the pump has had to be temporarily set out of operation for such manual actuation of the valve.

SUMMARY OF THE INVENTION

The present invention seeks to realize automatic return of the piston in a fluid operated, linear actuating machine for punching and other applications where it is desired to retract the piston under high fluid pressure.

Briefly, the invention may be summarized as a fluid operated, double acting, linear actuating machine suitable for punching and other applications, comprising a casing having formed therein both a fluid reservoir and a piston chamber. A piston is reciprocably mounted in the piston chamber to define a pair of opposed fluid chambers therein, with a piston rod extending from the piston and projecting out of the casing for carrying a desired tool such as a punch. Pump means is also mounted to the casing for pressurizing the fluid contained in the reservoir. The pressurized fluid is to be delivered to either of the pair of fluid chambers via directional control valve means for extension and contraction of the piston rod. Sensing means senses the extension and contraction of the piston rod. Also included is control means connected to the directional control valve means and the sensing means for causing the piston rod to be contracted under fluid pressure upon extension.

In use of the machine of the foregoing construction for punching, a punch may be replaceably mounted to the end of the piston rod, and a die may be fixed to the casing in opposed relationship to the punch. A hole will be created in work such as sheet steel being held between punch and die as the punch is driven through the work into the die by the extension of the piston rod. This piston rod extension is sensed by the sensing means, whereupon the control means cases the directional control valve means to deliver the pressurized fluid into the rod end chamber and to drain the fluid from the head end chamber. Thus, with the consequent contraction of the piston rod under fluid pressure, the die will be forcibly withdrawn out of the hole in the work.

Thus, according to the present invention, the fluid reservoir and the pump means comprising a pump and a drive motor therefor are both compactly mounted within the casing, so that the machine is far more operable than the conventional devices divided into a machine part and a hydraulic unit.

Another advantage is that the machine is double acting, meaning that fluid pressure is utilized for both extension and contraction of the piston rod. Moreover, the piston rod automatically and immediately contracts upon full extension. This advantage makes the machine particularly well suited for punching, as the punch is readily and forcibly withdrawable out of the hole in the work. The clearance between the punch and the work edge defining the hole can be reduced to a minimum, and the hole can be formed with high dimensional accuracy and without taper. Additionally, the automatic, quick return of the punch will greatly expedite punching operation.

The above and other features and advantages of this invention and the manner of realizing them will become more apparent, and the invention itself will best be understood, from a study of the following description and appended claims, with reference had to the attached drawings showing some preferred embodiments of the invention.

DESCRIPTION OF THE PREFERRED EMBODIMENTS

Figure 1:
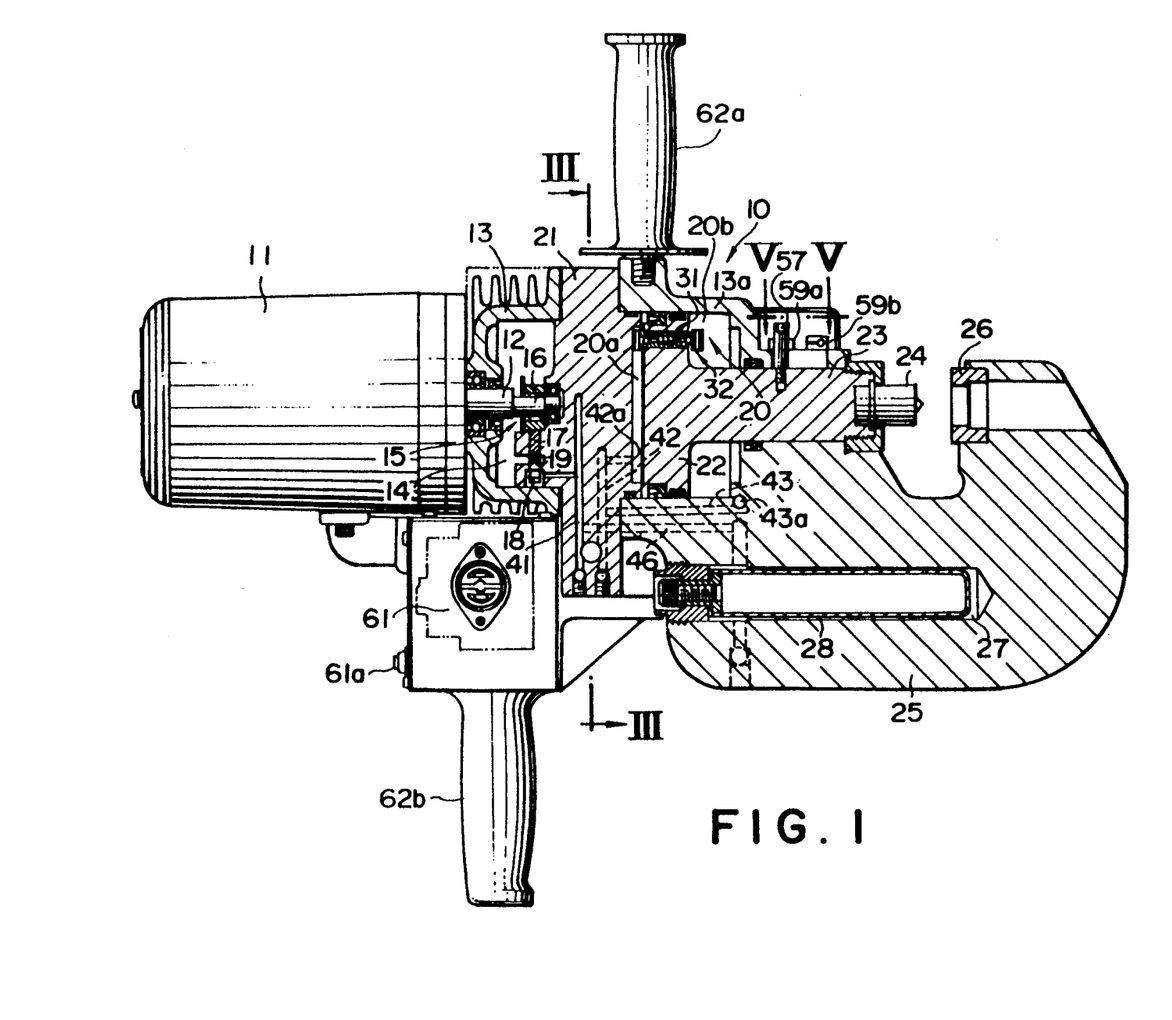
FIG. 1 is an axial section through the hydraulic, double acting punching machine constructed in accordance with the novel concepts of this invention.

The fluid operated, linear actuating machine according to the invention is illustrated in FIG. 1 as portable hydraulic punch. Generally designated 10, the hydraulic punch includes an electric motor 11, complete with an armature shaft 12, mounted to the rear end, shown directed to the left in FIG. 1, of a casing 13. The casing 13 has fluid tightly defined therein a hydraulic fluid reservoir 14 into which the motor armature shaft 12 extends. For pressuring the fluid contained in the reservoir 14, a pump 15 is provided which comprises a drive cam 16 formed eccentrically on the motor armature shaft 12 for joint rotation therewith, a piston 17 to be reciprocated linearly by the drive cam via a needle bearing, and a shutoff valve 18 disposed in a fluid passageway from the reservoir 14. A spring 19 acts on the shutoff valve 18 to hold the fluid passageway normally closed.

Also fluid tightly defined in the casing 13 is a piston chamber 20 which is separated from the reservoir 14 by a partition 21. A piston 22 is reciprocably mounted in the piston chamber 20, dividing the same into a head end chamber 20a and a rod end chamber 20b. The piston 22 is shown formed in one piece with a piston rod 23 projecting out of the casing by slidably extending through the front end portion 13a of the casing 13. A punch 24 is mounted to the projecting end of the piston rod 23.

The casing 13 is further formed to include a jaw 25 to which a die 26 is mounted opposite the punch 24. The jaw 25 has defined therein a cushioning chamber 27 accommodating an air bag 28 capable of elastic deformation for cushioning the impact of punching.

Figure 2:
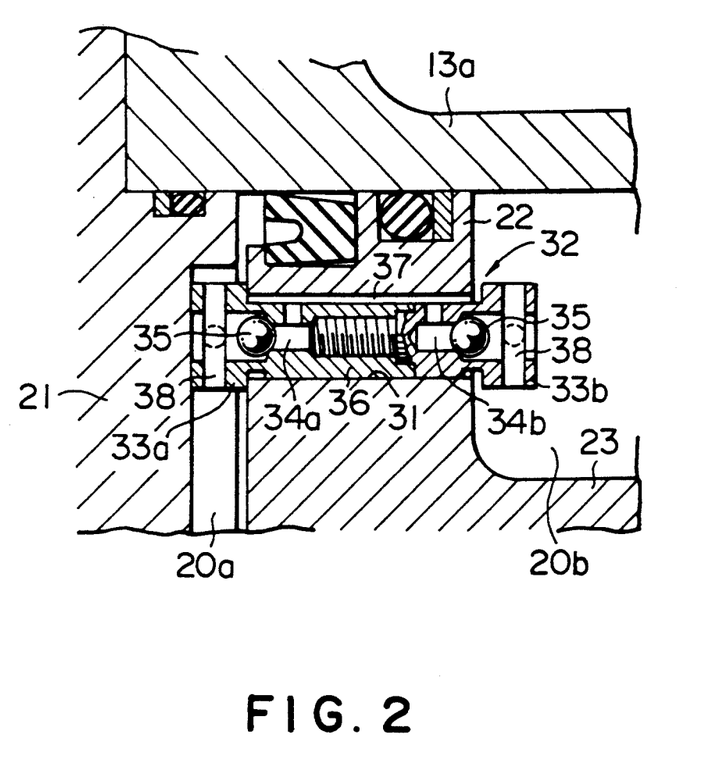
FIG. 2 is an enlarged, fragmentary section through relief valve means included in the punching machine of FIG. 1.

As shown also in FIG. 1 and in more detail in FIG. 2 the piston 22 is provided with relief valve means 32 for bleeding off excessive pressure from either of the head end chamber 20a and rod end chamber 20b. The relief valve means 32 comprises two tubular valve bodies 33a and 33b which are screwed together end to end and which is slidably mounted in a hole 31 extending through the piston 22 in a direction parallel to its axis. The valve bodies 33a and 33b have headed ends projecting out of the hole 31 and disposed respectively in the head end chamber 20a and the rod end chamber 20b. Two check balls 35 are mounted in fluid passageways 34a and 34b in the valve bodies 33a and 33b. These balls are confined in the fluid passageways 24a and 34b by pins 38. It will also be noted from FIG. 2 that the valve bodies 33a and 33b are recessed longitudinally to provide a gap 37 which can be placed in communication with either of the two fluid 30 chambers 20a and 20b depending upon the longitudinal position of the valve bodies 33a and 33b relative to the piston 22. The functioning of this relief valve means 32 will become apparent in the course of the subsequent description of operation.

Figure 3:
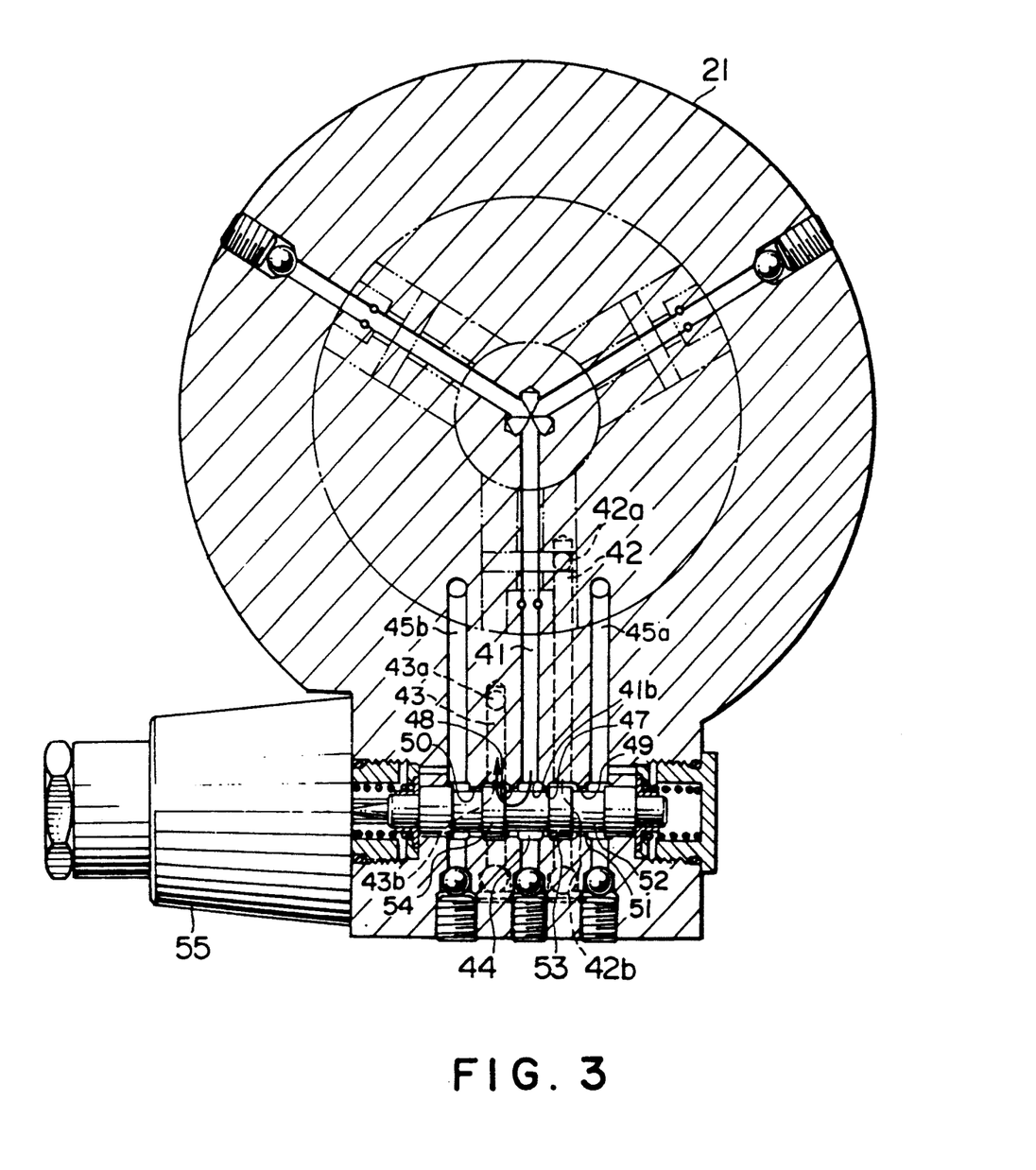
FIG. 3 is an enlarged section taken along the line III—III in FIG. 1 and showing in particular the directional control valve means included in the punching machine, the valve means being shown in a state for piston rod contraction.

FIG. 3 is a detailed illustration of fluid passageways formed in the partition 21 for the delivery of pressurized fluid from the pump 15 into the two fluid chambers 20a and 20b. As will be better understood by referring also to FIG. 1, such passageways include a pump passageway 41 in communication with the pump 15, an extension passageway 42 having an outlet port 42a open to the head end chamber 20a, and a contraction passageway 43 having an outlet port 43a open to the rod end chamber 20b. All these passageways 41, 42 and 43 communicate with a bore 44 in which a valve spool 52 is reciprocably mounted to make up a directional control valve 51.

Also formed in the partition 21 are fluid passageways 45a and 45b for draining the fluid from the fluid chambers 20a and 20b back to the reservoir 14. An additional fluid passageway 46, FIG. 1, extends through the casing 13 and partition 21 for communicating the reservoir 14 with the cushioning chamber 27.

With reference again to FIG. 3 the noted pump passageway 41, extension passageway 42 and contraction passageway 43 are open to the valve bore 44 at ports 41b, 42b and 43b, respectively, which are positioned in annular undercuts in the valve bore 44. Such annular undercuts in the valve bore 44 alternate with annular lands or seats for sliding engagement with the valve spool 52. The bore lands include a first land 47 between pump passageway 41 and extension passageway 42, a second land 48 between pump passageway 41 and contraction passageway 43, a third land 49 between extension passageway 42 and drain passageway 45a, and a fourth land 50 between contraction passageway 43 and drain passageway 45b.

The valve spool 52 is also undercut to provide a first land 53 capable of sliding engagement with either of the first 47 and third 49 bore lands, and a second land 54 capable of sliding engagement with either of the second 48 and fourth 50 bore lands. The valve spool 52 is coupled at one end to a solenoid 55 thereby to be actuated longitudinally between the FIG. 3 position and that of FIG. 4.

FIG. 1 indicates at 57 a switch actuator pin planted in the piston rod 23 and extending radially outwardly therefrom. As shown on an enlarged scale in FIG. 5, the switch actuator pin 57 extends through a slot 58 in the front end portion 13a of the casing 13 for actuating a first limit switch 59a upon retraction of the piston rod 23, and a second limit switch 59b upon extension of the piston rod. Preferably, the pin 57 may be shaped and sized to travel in sliding contact with the casing front end portion 13a for serving the additional purpose of preventing the piston rod 23 from angular displacement.

FIG. 1 also shows electric control means 61 mounted to the casing 13 for controlling the operations of the electric motor 11 and the solenoid actuated directional control valve 51. The two limit switches 59a and 59b are connected in circuit with the control means 61 in order to provide electric piston position signals needed for automatically operating the directional control valve 51 in accordance with the invention. A pushbutton start switch 61a is also connected in circuit with the control means 61. The start switch 61a is to be depressed for the commencement of punching operation.

Seen at 62a and 62b in FIG. 1 are a pair of handgrips screwed into the casing 13 and projecting laterally in opposite directions therefrom. These handgrips are to be grasped by the hands in use of the punching machine 10. The start switch 61a is disposed adjacent the right hand handgrip 62a for the ease of manipulation.

OPERATION

In FIG. 1 is shown the punching machine 10 in its normal state, with the piston rod 23 retracted. The switch actuator pin 57 on the piston rod 23 is therefore engaged with the first limit switch 59a. Further, as shown in FIG. 2, the head of the head end chamber relief valve body 33a is caught between partition 21 and piston 22, with the ball 35 closing the fluid passageway 34a against fluid flow from head end chamber 20a into rod end chamber 20b. Still further the spool 52 of the directional control valve 51 is held retracted as depicted in FIG. 3, holding the pump passageway 41 in communication with the contraction passageway 43 and out of communication with the extension passageway 42.

The work, not shown, such as a piece of sheet steel to be punched may be held between punch 24 and die 26. Then the start switch 61a may be depressed. The resulting rotation of the electric drive motor 11 will be translated into the linear reciprocation of the pump piston 17 by the eccentric drive cam 16 on the motor armature shaft 12. The hydraulic fluid in the reservoir 14 will be pressurized by the reciprocating piston 17 and forced into the pump passageway 41 and thence into the bore 44, FIG. 3, of the solenoid actuated directional control valve 51.

Figure 4:
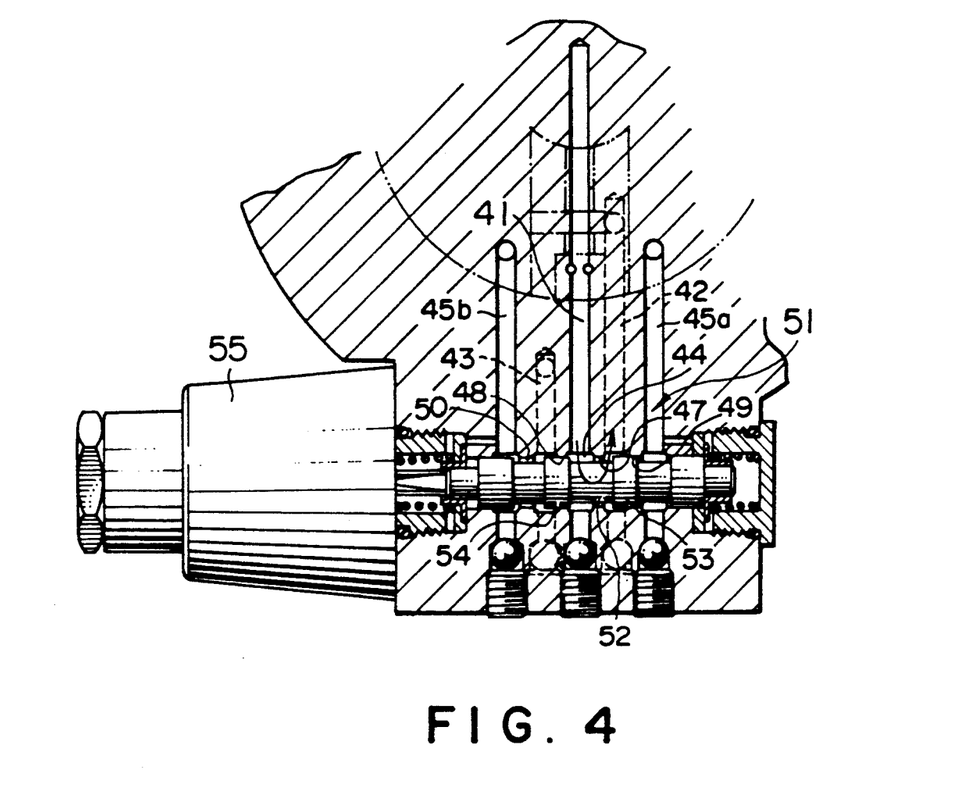
FIG. 4 is a view similar to FIG. 3 except that the directional control valve means is shown in a state for piston rod extension.

The depression of the start switch 61a will result also in the energization of the solenoid 55, with the consequent travel of the valve spool 53 from its FIG. 3 position to that of FIG. 4. The valve spool 53 when thus actuated to the FIG. 4 position will discommunicate the pump passageway 41 from the contraction passageway 43 and, instead, communicate the pump passageway with the extension passageway 42.

Thus the pressurized fluid from the reservoir 14 will be directed into the head end chamber 20a thereby causing the extension of the piston rod 23. The punch 24 on the piston rod 23 will then create a hole in the work in cooperation with the mating die 26.

The switch actuator pin 57 on the piston rod 23 will disengage the first limit 59a immediately when the piston 22 starts traveling on its extension stroke, so that the first limit switch 59a will signal the control means 61 to that effect. Then, upon extension of the piston rod 23 to a predetermined degree, the pin 57 will engage the second limit switch 59b. Inputting the piston position signal from the second limit switch 59b, the control means 61 will cause the solenoid 55 to retract the valve spool 52 from its FIG. 4 position back to that of FIG. 3, in which latter position the extension passageway 42 will communicate with the drain passageway 42a. The fluid will therefore be drained from the head end chamber 20a into the reservoir 14. Further, since the valve spool 52 when in the FIG. 3 position communicates the pump passageway 41 with the contraction passageway 43, the pressurized fluid will be directed into the rod end chamber 20b. The punch 24 will be withdrawn out of the hole that has been formed in the work as the piston rod 23 is retracted under fluid pressure.

One cycle of punching operation will come to an end as the pin 57 subsequently actuates the first limit switch 59 to cause the control means 61 to set the drive motor 11 out of rotation upon full retraction of the piston rod 23. The drive motor 11 has been in operation throughout the foregoing cycle of operation, so that the punch 24 can be driven forward to create a hole in the work, and withdrawn therefrom, quickly and automatically.

Possibly, and in rare cases, the directional control valve 51 may fail to operate when the piston rod 23 is fully extended or contracted, resulting in the continued delivery of the pressurized fluid into either of the head end chamber 20a and rod end chamber 20b. The relief valve means 32 will then operate as follows to bleed off excessive pressure from either chamber.

Assume for instance that the directional control valve 51 has somehow failed to operate when the piston 22 is in the fully retracted position of FIG. 2. Since then the valve body 33a butts against the partition 21, the gap 37 is thereby discommunicate from the head end chamber 20a. However, the continued delivery of 35 pressurized fluid into the rod end chamber 20b will result in the dislodgement of the check ball 35 from the seat formed in the fluid passageway 34a in the valve body 33a. Thus the excess pressure in the rod end chamber 20b will be admitted into the head end chamber 20a through the gap 37 and passageway 34a. The directional control valve 51 is then in the FIG. 3 position, holding the extension passageway 42 in communication with the drain passageway 45a, so that the excess pressure that has been admitted as above into the head end chamber 20a will be drained back into the reservoir 14. Excess pressure will be similarly bled off from the head end chamber 20b into the reservoir 14.

Thus, according to the present invention, the complete cycle of punching operation takes place automatically by simple depression of the pushbutton start switch 61a, with the drive motor 11 maintained in continuous rotation. The punching machine 10 is also notable for its improved operability as the pump 15, reservoir 14, and pump drive motor 11 are all compactly incorporated into the machine.

SECOND FORM

Figure 6:
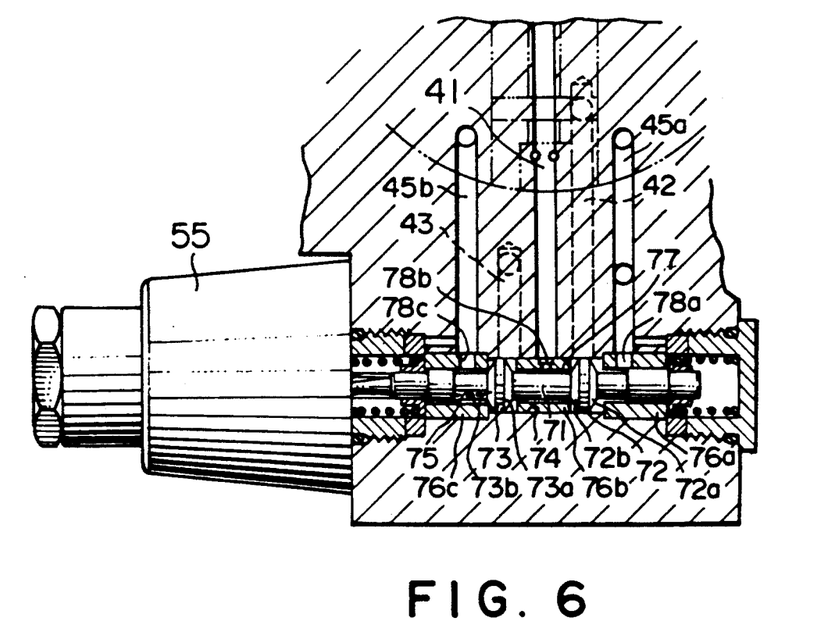
FIG. 6 is a view similar to FIG. 3 but showing alternate directional control valve means, the valve means being shown in a state for piston rod contraction.
Figure 7:
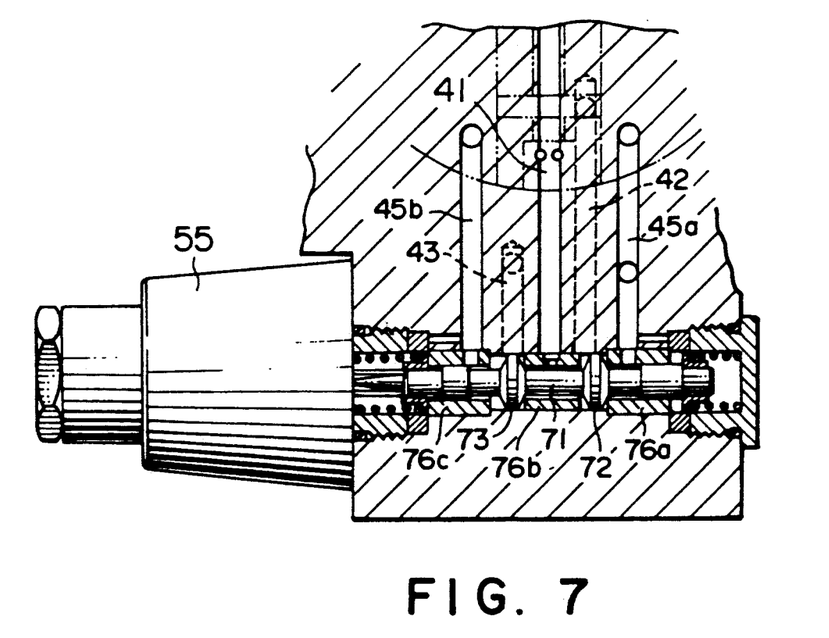
FIG. 7 is a view similar to FIG. 6 except that the alternate directional control valve means is shown in a state for piston rod extension.

FIGS. 6 and 7 show another preferred form of directional control valve suitable for use in the punching machine 10 in place of the valve 51. The alternate directional control valve includes a spool 71 slidably mounted a space 75 within three tubular seat members 76a, 76b and 76c which in turn are immovably mounted in alignment in a valve bore 74. These seat members 76a-76c are spaced longitudinally from one another, and the extension passageway 42 and contraction passageway 43, which communicate as aforesaid with the head end chamber and rod end chamber of the punching machine, are open respectively to the two spacings provided between the seat members.

The valve spool 71 has formed thereon two lands 72 and 73 which are loosely received respectively in the two spacings between the seat members 76a-76c. The lands 72 and 73 have tapered sides 72a, 72b, 73a and 73b for movement into and out of pressure tight contact with the opposed ends of the seat members.

The valve spool 71 is received in the tubular seat members 76a-76c with a clearance or gap 77. This gap is in constant communication with the pump passageway 41 and two drain passageways 45a and 45b via holes 78b, 78a and 78c which are formed in the seat members 76a-76c, respectively.

The solenoid 55 actuates the valve spool 71 between the positions of FIGS. 6 and 7. When the spool 71 is in the FIG. 6 position, the tapered side 72b of the land 72 is held against one end of the intermediate seat member 76b, discommunicating the pump passageway 41 from the extension passageway 42. The other land 73 of the spool 71 is out of contact with the intermediate seat member 76b, so that the pump passageway 41 is in communication with the contraction passageway 43. The pressurized fluid from the pump is therefore directed into the rod end chamber, with the consequent retraction of the piston rod.

When the spool 71 is in the FIG. 7 position, on the other hand, the tapered side 73a of the land 73 is held against one end of the intermediate seat member 76b, discommunicating the pump passageway 41 from the contraction passageway 43. The other land 72 of the spool 71 is out of contact with the intermediate seat member 76b, communicating the pump passageway 41 with the extension passageway 42. The pressurized fluid from the pump is therefore directed into the head end chamber for the extension of the piston rod.

Thus, in this alternate directional control valve, the lands 72 and 73 on the spool 71 but sideways against the ends of the seat members 76a-76c for more positively shutting off communication between the pump passageway 41 and the extension passageway 42 and contraction passageway 43 against fluid leakage.

THIRD FORM

Figure 5:
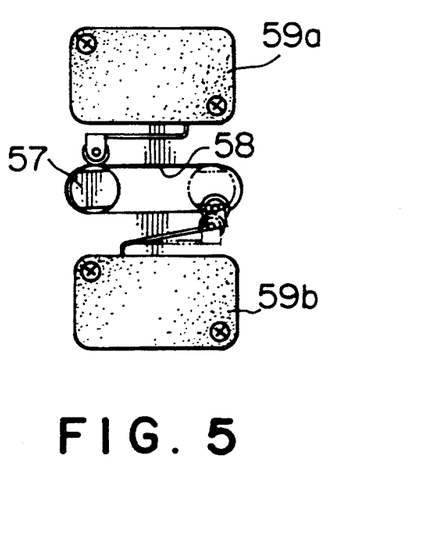
FIG. 5 is an enlarged plan view of means for sensing the extension and contraction of the piston rod.
Figure 8:
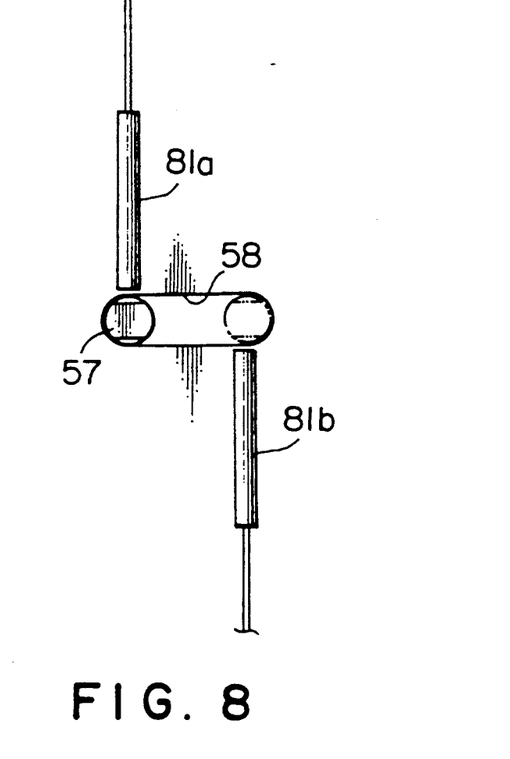
FIG. 8 is a view similar to FIG. 5 but showing alternate means for sensing the extension and contraction of the piston rod.

As illustrated in FIG. 8, a pair of proximity switches 81a and 81b may be employed in lieu of the limit switches 59a and 59b of FIG. 5 for detecting the extreme positions of the piston 22 of the FIG. 1 punching machine 10. Disposed adjacent the opposite ends of the slot 58 in the casing, the proximity switches 81a and 81b are to be actuated when the switch actuator pin 57 on the piston rod comes sufficiently near the switches. Such noncontact actuation of the switches assures their longer useful life.

FOURTH FORM

Figure 9:
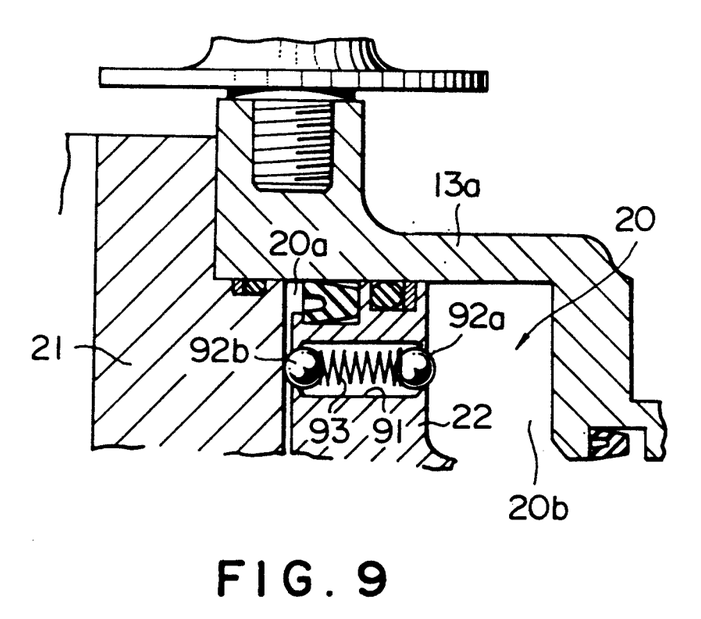
FIG. 9 is a view similar to FIG. 2 but showing alternate relief valve means.

In FIG. 9 is shown alternate relief valve means for use in the FIG. 1 punching machine 10 in place of the relief valve means 32 shown in FIG. 2. The alternate relief valve means comprises two balls 92a and 92b mounted within a hole or relief passageway 91 extending through the piston 22 for intercommunicating the head end chamber 20a and rod end chamber 20b. The relief passageway 91 has its opposite ends constricted to prevent the dislodgement of the balls 92a and 92b. A helical compression spring 93 urges the balls 92a and 92bagainst these constricted ends of the relief passageway 91.

Therefore, upon development of excessive fluid pressure in either of the fluid chambers 20a and 20b, the compression spring 93 will yield to permit one of the balls 92a and 92b to move off the associated constricted end of the relief passageway 91, thereby admitting such excess fluid into the relief passageway. This alternate relief valve means offers the advantage of greater simplicity in construction than the FIG. 2 relief valve means 32.

Although the fluid operated linear actuating machine in accordance with the present invention has been shown and described hereinbefore in some specific forms and as adapted for use as a punching machine, it is not desired that the invention be limited by the exact details of such disclosure. For example, a rotary valve could be employed instead of the spool valve for the directional control of fluid flow to and from the pair of opposed fluid chambers. A variety of other modifications, alternations or adaptations of the illustrated embodiments may be resorted to without departure from the fair meaning or proper scope of the following claims.

What is claimed is:

1. A fluid operated, double acting, linear actuating machine suitable for punching and other applications, comprising:
   (a) a casing having a fluid reservoir and a piston chamber defined therein;

(b) a piston reciprocably mounted in the piston chamber and defining a pair of opposed fluid chambers therein;
(c) a piston rod extending from the piston and projecting out of the casing;
(d) pump means mounted to the casing for pressuring a fluid contained in the fluid reservoir;
(e) directional control valve means for alternately placing the pump means in communication with the pair of fluid chambers for extension and contraction of the piston rod;
(f) sensing means for sensing the extension and contraction of the piston rod; and
(g) control means connected to the directional control valve means and the sensing means for causing the piston rod to be contracted under fluid pressure upon extension; and wherein the directional control valve means comprises:
(a) a directional control valve; and
(b) a solenoid connected in circuit with the control means for actuating the directional control valve.

2. The linear actuating machine of claim 1 wherein the directional control valve is a spool valve.

3. A fluid operated, double acting, linear actuating machine suitable for punching and other applications, comprising:

(a) a casing having a fluid reservoir and a piston chamber defined therein;
(b) a piston reciprocably mounted in the piston chamber and defining a pair of opposed fluid chambers therein;
(c) a piston rod extending form the piston and projecting out of the casing;
(d) pump means mounted to the casing for pressuring a fluid contained in the fluid reservoir;
(e) directional control valve means for alternately placing the pump means in communication with the pair of fluid chambers for extension and contraction of the piston rod;
(f) sensing means for sensing the extension and contraction of the piston rod; and
(g) control means connected to the directional control valve means and the sensing means for causing the piston rod to be contracted under fluid pressure upon extension; and wherein the sensing means comprises:
(a) a switch actuator formed on the piston rod for joint reciprocation therewith; and
(b) a pair of switches on the casing to be actuated by the switch actuator upon extension and contraction of the piston rod.

4. The linear actuating machine of claim 1 further comprising relief valve means mounted to the piston for bleeding off excessive fluid pressure from either of the pair of fluid chambers.

* * * * *